United States Patent
Dembeck

(10) Patent No.: US 10,183,393 B2
(45) Date of Patent: Jan. 22, 2019

(54) LEVEL REFERENCING DRILL GUIDE

(71) Applicant: THE BOEING COMPANY, Chicago, IL (US)

(72) Inventor: David Michael Dembeck, Chicago, IL (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 15/171,701

(22) Filed: Jun. 2, 2016

(65) Prior Publication Data

US 2017/0348847 A1 Dec. 7, 2017

(51) Int. Cl.
*B23B 45/14* (2006.01)
*B23B 49/02* (2006.01)
*B25H 1/00* (2006.01)
*B23B 45/00* (2006.01)
*B23B 49/00* (2006.01)

(52) U.S. Cl.
CPC ......... *B25H 1/0085* (2013.01); *B23B 45/003* (2013.01); *B23B 49/00* (2013.01); *B23B 2260/094* (2013.01)

(58) Field of Classification Search
CPC . B23B 2260/094; B23B 47/28; B23B 47/281; B23B 47/282; B23B 47/284; B23B 47/285; B23B 47/287; B23B 49/00; B23B 47/028; B25F 5/022; B25F 5/023; B25F 5/024; Y10T 408/175; Y10T 408/21; Y10T 408/55; Y10T 408/553; Y10T 408/567; Y10T 408/97; G01C 9/34

USPC ................... 33/333, 334, 370–373, 381–383
See application file for complete search history.

(56) References Cited

U.S. PATENT DOCUMENTS

| | | | | |
|---|---|---|---|---|
| 1,098,724 A | * | 6/1914 | Hartman et al. | F16C 29/04 384/49 |
| 1,782,284 A | * | 11/1930 | Betancourt | B25H 1/0085 33/645 |
| 2,635,348 A | * | 4/1953 | Jones | B25H 1/0078 33/638 |
| 3,686,768 A | * | 8/1972 | Humbert | B23Q 17/22 33/370 |
| 3,804,546 A | * | 4/1974 | Boyajian | B23B 49/02 408/115 R |
| 4,130,372 A | * | 12/1978 | Vugrin | B23B 49/023 408/115 B |
| 4,500,141 A | * | 2/1985 | Daugherty | E21B 19/24 384/50 |

(Continued)

*Primary Examiner* — Nicole N Ramos
(74) *Attorney, Agent, or Firm* — Marshall, Gerstein & Borun LLP

(57) ABSTRACT

A device which includes a guide member which includes a first end portion and an opposing second end portion. The first end portion defines a first plane and an opening is defined by the guide member, wherein the opening extends along the guide member in a direction perpendicular to the first plane. The device further includes a first bubble vial attached to the guide member wherein the first bubble vial extends within a second plane. The device further includes a second bubble vial attached to the guide member, wherein the second bubble vial extends within a third plane, the second and third planes are in angular relationship relative to one another and the first and second bubble vials are each rotationally adjustable relative to the guide member.

17 Claims, 6 Drawing Sheets

(56) References Cited

U.S. PATENT DOCUMENTS

| | | | | |
|---|---|---|---|---|
| 5,177,873 | A * | 1/1993 | Tate | G01C 9/28 33/385 |
| 5,800,099 | A * | 9/1998 | Cooper | B23B 47/281 408/1 R |
| 5,915,891 | A * | 6/1999 | Fridman | B23B 47/28 408/1 R |
| 6,186,708 | B1 * | 2/2001 | Fridman | B23B 47/28 408/1 R |
| 7,363,719 | B2 * | 4/2008 | Levinson | G01C 9/34 33/347 |
| 7,555,842 | B1 * | 7/2009 | Asay | G01C 15/00 33/372 |
| 8,292,551 | B2 * | 10/2012 | Jenkins | B23B 47/284 408/115 B |
| 9,636,752 | B2 * | 5/2017 | Adkin | B23B 47/281 |
| 2003/0133764 | A1 * | 7/2003 | Erickson | B23B 49/008 408/97 |
| 2009/0060668 | A1 * | 3/2009 | Ono | B23B 49/02 408/115 R |

* cited by examiner

LEVEL REFERENCING DRILL GUIDE

FIELD

The present invention relates to a guide for drilling holes through a structure, and more particularly, a guide that provides a drill a desired orientation relative to the surface of structure to be drilled.

BACKGROUND

Difficulties arise in drilling holes into and/or through a structure. This particularly occurs when a driller uses a hand held drill and a hole needs to be drilled into the structure such that the hole needs to remain within a relatively small tolerance of angular deviation from a desired orientation with respect to the surface of the structure. Often the desired orientation of the hole relative to the surface of the structure is perpendicular. Should the drilled hole deviate from the tolerance, the hole will result in positioning a fastener in an undesirable position relative to the surfaces of the structure. For example, a tightening of the fastener in a hole outside the tolerance of deviation from perpendicular will cause a head and/or tightening nut to exert an undesired uneven torque force onto the surface of the structure. To avoid this type of undesired result a drilled hole which exceeds the permitted tolerance will need to be reworked which results in higher costs and delays in fabrication.

Other conditions complicate drilling holes which need to comply with a small tolerance of angular deviation with respect to the surface of the structure being drilled. These conditions include drilling areas with little room to maneuver, are not well lit or are otherwise obstructed for drilling. These conditions, for example, arise in drilling holes in fabricating an aircraft such as within a wing. The tolerance of angular deviation from perpendicular is often targeted to be within two degrees (2°) and such surfaces of this structure are often slightly contoured. In other instances, outside that of fabricating an aircraft, conditions are can be further complicated. These conditions may include a hole needs to be drilled into and/or through a structure wherein the environment is potentially explosive and would require Class 1 Division 1 rated electronic devices that are explosion proof.

Current drill guides are often inadequate as a result of inaccessibility of the area or surface to be drilled. The drilling process in these instances is slowed. Drilling guides such as egg cups are unstable on small surfaces, would require custom designs for each hole to be drilled and may require the operator to have a free hand all of which slows the drilling process. Robotic drilling may be employed but is generally cost prohibitive. Opposite surface sensing/drilling equipment tends to be clumsy, faulty and slow in carrying out the drilling process.

SUMMARY

An example of a device includes a guide member which includes a first end portion and an opposing second end portion. The first end portion defines a first plane and an opening defined by the guide member, wherein the opening extends along the guide member in a direction perpendicular to the first plane. The device further includes a first bubble vial attached to the guide member wherein the first bubble vial extends within a second plane. The device further includes a second bubble vial attached to the guide member, wherein the second bubble vial extends within a third plane, the second and third planes are in angular relationship relative to one another and the first and second bubble vial are each rotationally adjustable relative to the guide member.

An example of a device assembly for forming a hole for accommodating a fastener in fabricating an aircraft includes a structural component of an aircraft which includes a surface and a guide member which abuts against the surface. The guide member includes a first end portion and an opposing second end portion, wherein the first end portion defines a first plane and the first end portion abuts against the surface. Further included is an opening defined by the guide member, wherein the opening extends in a direction perpendicular to the first plane defined by the first end portion. A first bubble vial is attached to the guide member wherein the first bubble vial extends within a second plane. A second bubble vial is attached to the guide member wherein the second bubble vial extends within a third plane, the second and third planes are positioned in angular relationship relative to one another and each of the first and second bubble vial are rotationally adjustable relative to the guide member.

An example of a method for forming a hole in a structural component includes a step of abutting a guide member against a surface of the structural component, wherein the guide member includes a first end portion and an opposing second end portion. The first end portion defines a first plane and the first end portion abuts against the surface at a location for positioning a hole to be drilled into the structural component. An opening defined by the guide member extends in a direction perpendicular to the first plane. The method further includes a step of adjusting a first bubble vial attached to the guide member such that a bubble within the first bubble vial is positioned into a predetermined position within the first bubble vial and adjusting a second bubble vial attached to the guide member such that a bubble within the second bubble vial is positioned into another predetermined position within the second bubble vial. Each of the first and second bubble vials are rotationally adjustable relative to the guide member, the first bubble vial extends within a second plane and the second bubble vial extends within a third plane and the second and third planes are positioned in angular relationship relative to one another.

The features, functions, and advantages that have been discussed can be achieved independently in various embodiments or may be combined in yet other embodiments further details of which can be seen with reference to the following description and drawings.

DESCRIPTION

It can be appreciated that it is often a difficult task to drill holes in a structural component such that the hole is substantially perpendicular to the surface of the structural component. This is particularly challenging where the structural component being drilled has a contoured surface and/or the surface to be drilled is further confined within a small area in which to maneuver. Additional challenge is presented where the holes are being drilled with the use of a hand held drill. These challenging conditions often exist, for example, in fabricating an aircraft.

These conditions are often present, for example, in fabricating a wing of an aircraft. The quarters for drilling are often relatively small within the confines of an internal portion of a wing. The surfaces of structural components of a wing structure to be drilled are often contoured surfaces. A hand drill is often used for drilling these holes. These conditions are further complicated with an acceptable tolerance of the hole angularly deviating from being perpendicular relative to the surface of the structural component, being relatively small such as little as two degrees (2°).

These challenging drilling conditions can be overcome and timely and costly reworking of drilled holes can be avoided with the employment of drilling guide device 10, as portrayed in FIGS. 1-6. This will be further appreciated in the following description of drilling guide device 10 and the method of using drilling guide device 10.

Figure 1:
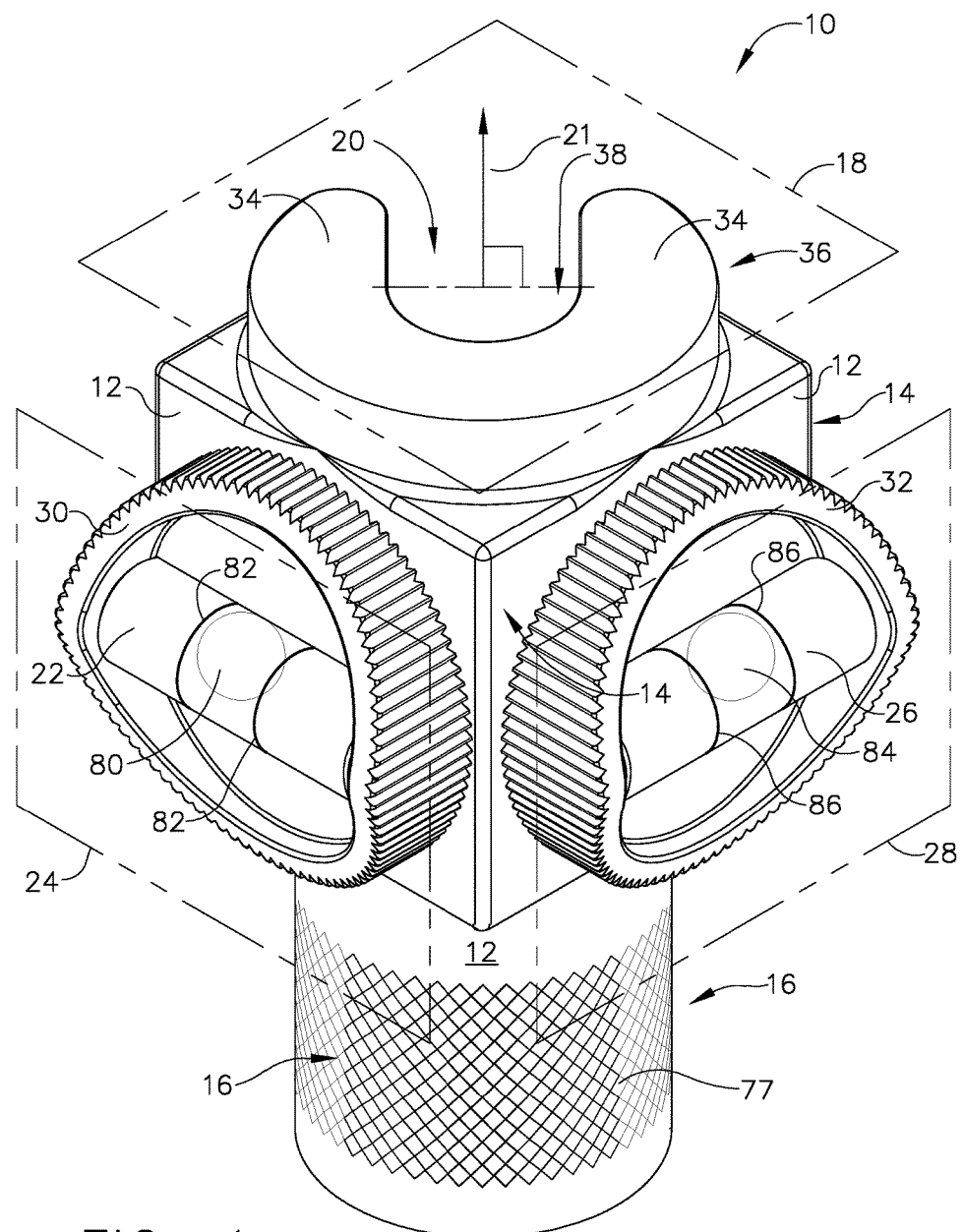
FIG. 1 is a top front perspective view of the guide member.
Figure 2:
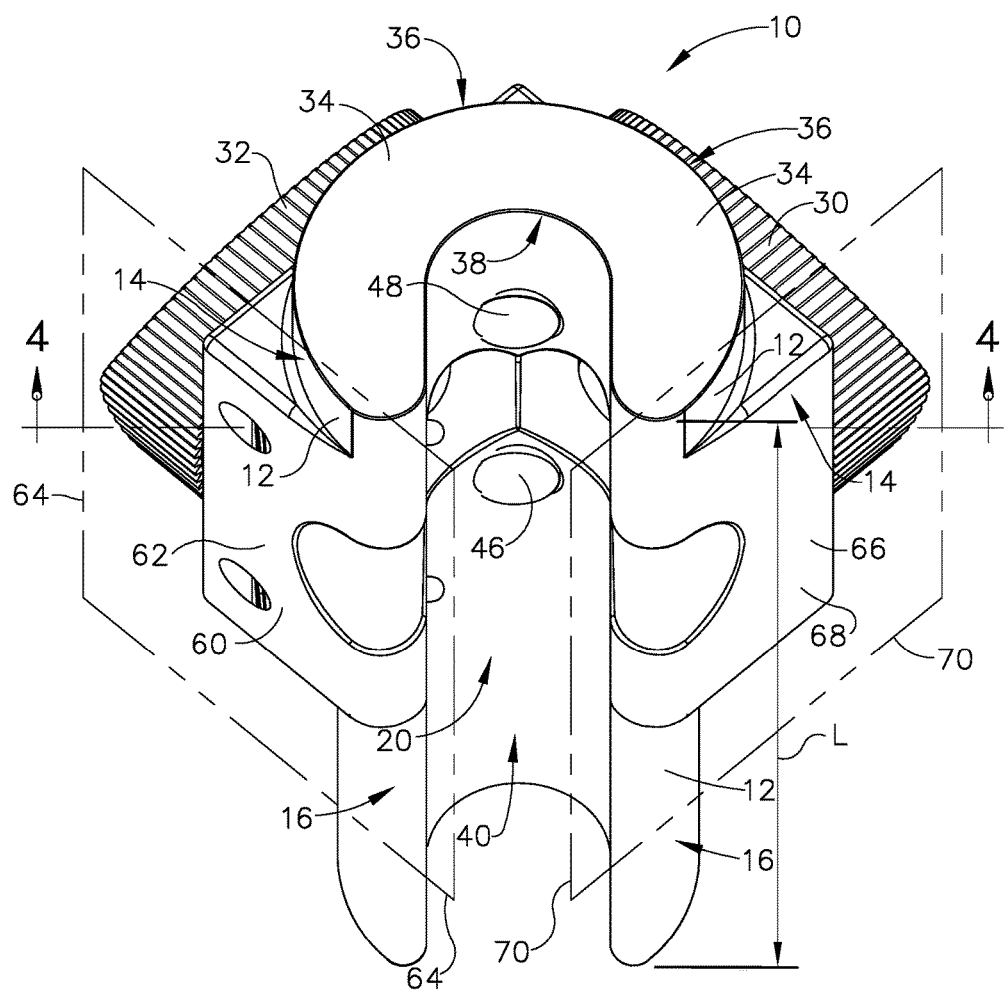
FIG. 2 is a top rear perspective view of the guide member as seen in FIG. 1.

In referring to FIGS. 1 and 2, guide member 12 is constructed of metal or similar durable material and includes a first end portion 14 and an opposing second end portion 16. First end portion 14 defines a first plane 18, as seen in FIG. 1, which will be described in more detail below. Guide member 12 defines opening 20, which extends along guide member 12, as seen in FIG. 2, and extends in a direction indicated by arrow 21, which is perpendicular to first plane 18, as also seen in FIG. 1.

Drilling guide device 10 further includes first bubble vial 22 attached, as will be further discussed below, to the guide member 12. First bubble vial 22 extends within second plane 24. Drilling guide device 10 further includes second bubble vial 26 also attached to guide member 12, which will also be discussed further below, and second bubble vial 26 extends within third plane 28.

Second plane 24 and third plane 28, as seen in FIG. 1, are positioned in angular relationship relative to one another. In this embodiment, the angular relationship between second plane 24 and third plane 28 is perpendicular to one another. First and second bubble vials 22, 26 are each rotationally adjustable relative to guide member 12.

First bubble vial 22 is attached to first dial member 30 and first dial member 30 is rotatably mounted to guide member 12 with a shaft (not shown). First dial member 30 rides above and along a channel (not shown) which contains an O-ring (not shown). First dial member 30 at the same time abuts against the O-ring. The O-ring is constructed, for example, of a material such as an elastomeric material. The user can hand turn first dial member 30 by applying a turning force to first dial member 30 overcoming a static friction force between first dial member 30 and the O-ring and allowing first dial member 30 to turn. With first dial member 30 rotatably adjusted to a desired predetermined position, the user will stop turning first dial member 30 and the static friction force between first dial member 30 and the elastomeric material of the O-ring will maintain the position of first dial member 30 and first bubble vial 22 in the predetermined position. The static friction will hold this predetermined position with guide member 12 being moved into different positions and locations and while guide member 12 also experiences vibrational forces exerted by a drill motor to which guide member 12 is secured to during drilling a hole into a structural component.

Second bubble vial 26 is similarly attached to second dial member 32 and second dial member 32 is rotatably mounted to guide member 12 with a shaft (not shown). Second dial member 32 rides above and along a channel (not shown) which contains an O-ring (not shown), as describe above for first dial member 30. Second dial member 32 at the same time abuts the O-ring (not shown) which is constructed of a material, as stated above, such as an elastomeric material. The user can hand turn second dial member 32 by applying a turning force to second dial member 32 overcoming a static friction force between second dial member 32 and the O-ring thereby allowing second dial member 32 to turn. With second dial member 32 rotatably adjusted to a desired predetermined position, the user will stop turning second dial member 32 and the friction force between second dial member 32 and the elastomeric material will maintain second dial member 32 and second bubble vial 26 in the predetermined position with guide member 12 being moved into different positions and locations and while guide member 12 experiences vibrational forces exerted by a drill motor to which guide member 12 is secured during drilling a hole into a structural component.

Figure 4:
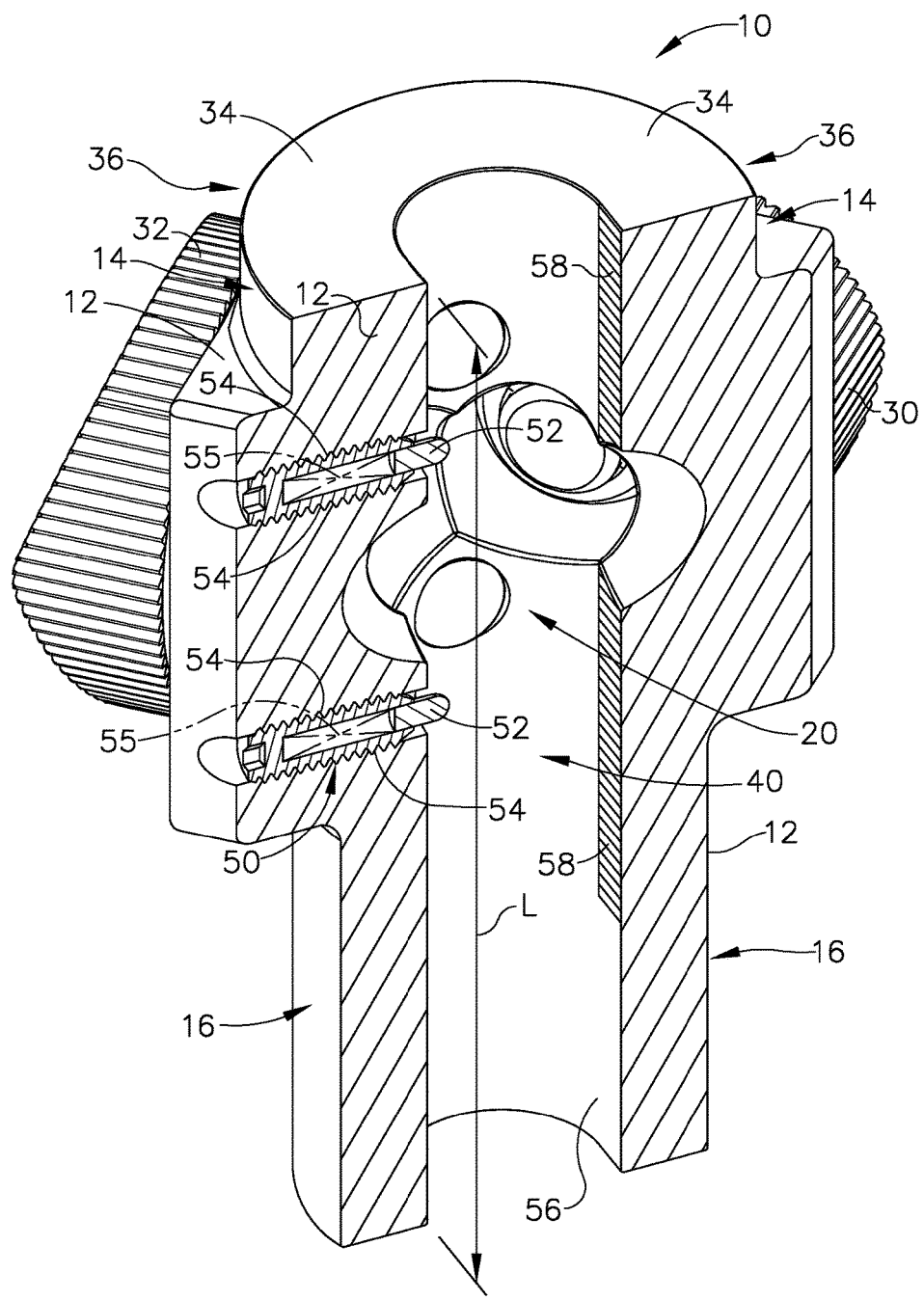
FIG. 4 is a cross sectional view of the guide member as seen along line 4-4 of FIG. 2.
Figure 6:
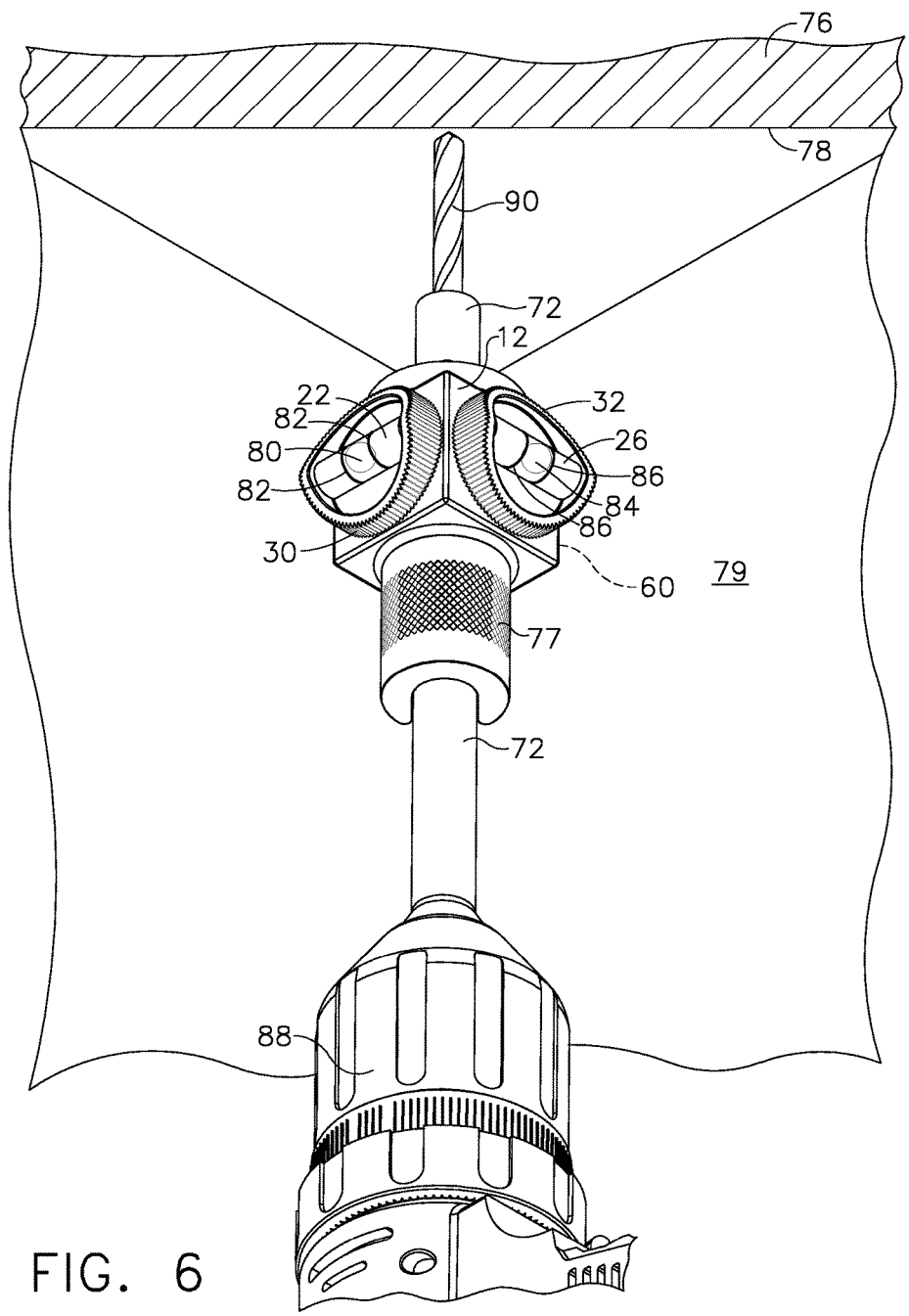
FIG. 6 is a bottom perspective view of the guide member secured to a drill motor shaft assembled for drilling a hole into a surface of a structural component.

First end portion 14 includes flat surface 34 positioned at distal end 36 of guide member 12. Flat surface 34 defines the orientation of first plane 18, as seen in FIG. 1, which will be a surface which will be used to abut a surface of a structural component in which a hole is intended to be drilled. Flat surface 34 is configured to define recess 38, wherein recess 38 is in communication with opening 20 defined by guide member 12. This arrangement permits a drill motor shaft 72, as will be later discussed in FIG. 6, to extend from within opening 20 beyond flat surface 34. Opening 20, as seen in FIGS. 2 and 4, is configured to be an elongated slot 40 which extends along guide member 12 and has length L and which extends in direction 21, seen in FIG. 1, perpendicular to first plane 18. Slot 40 is configured to receive a drill motor shaft 72, as seen in FIG. 6, which has an elongated configuration.

Flat surface 34 which defines first plane 18 has both surface 34 and plane 18 perpendicular to direction 21 in which slot 40 extends. With flat surface 34 positioned abutting against a surface of a structural component to be drilled, first plane 18 establishes an orientation of slot 40 into a substantially perpendicular relationship relative to the surface to be drilled. This orientation permits drill motor shaft 72 positioned in opening 20 to be placed in perpendicular relationship to flat surface 34.

Figure 3:
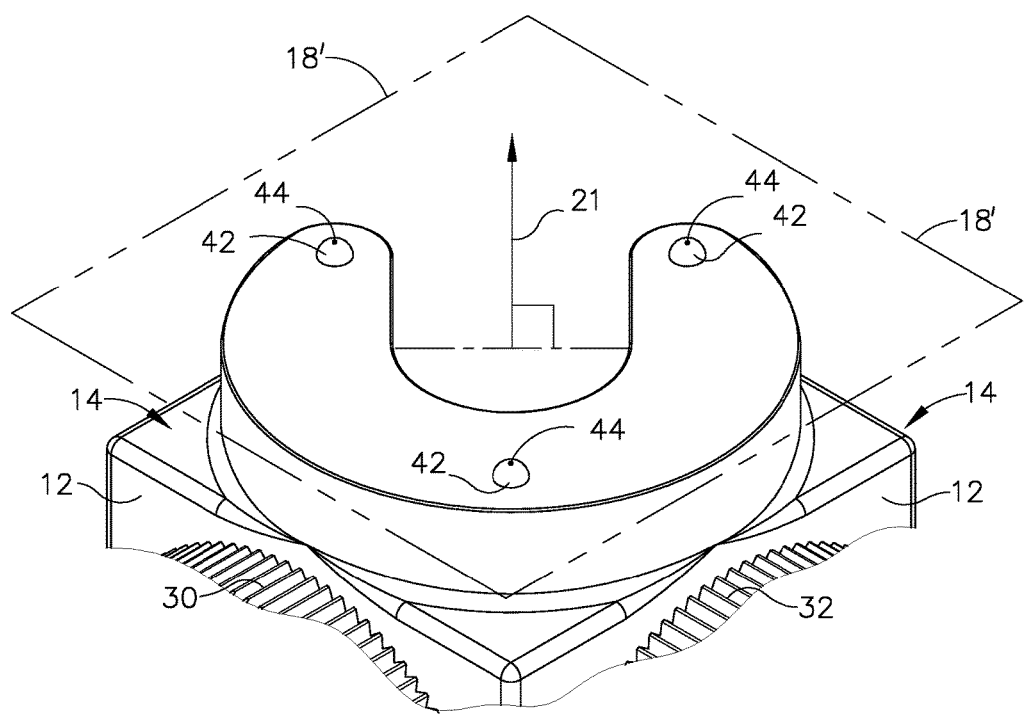
FIG. 3 is an enlarged partial top perspective view of a second embodiment of the guide member as seen in FIG. 1.
Figure 5:
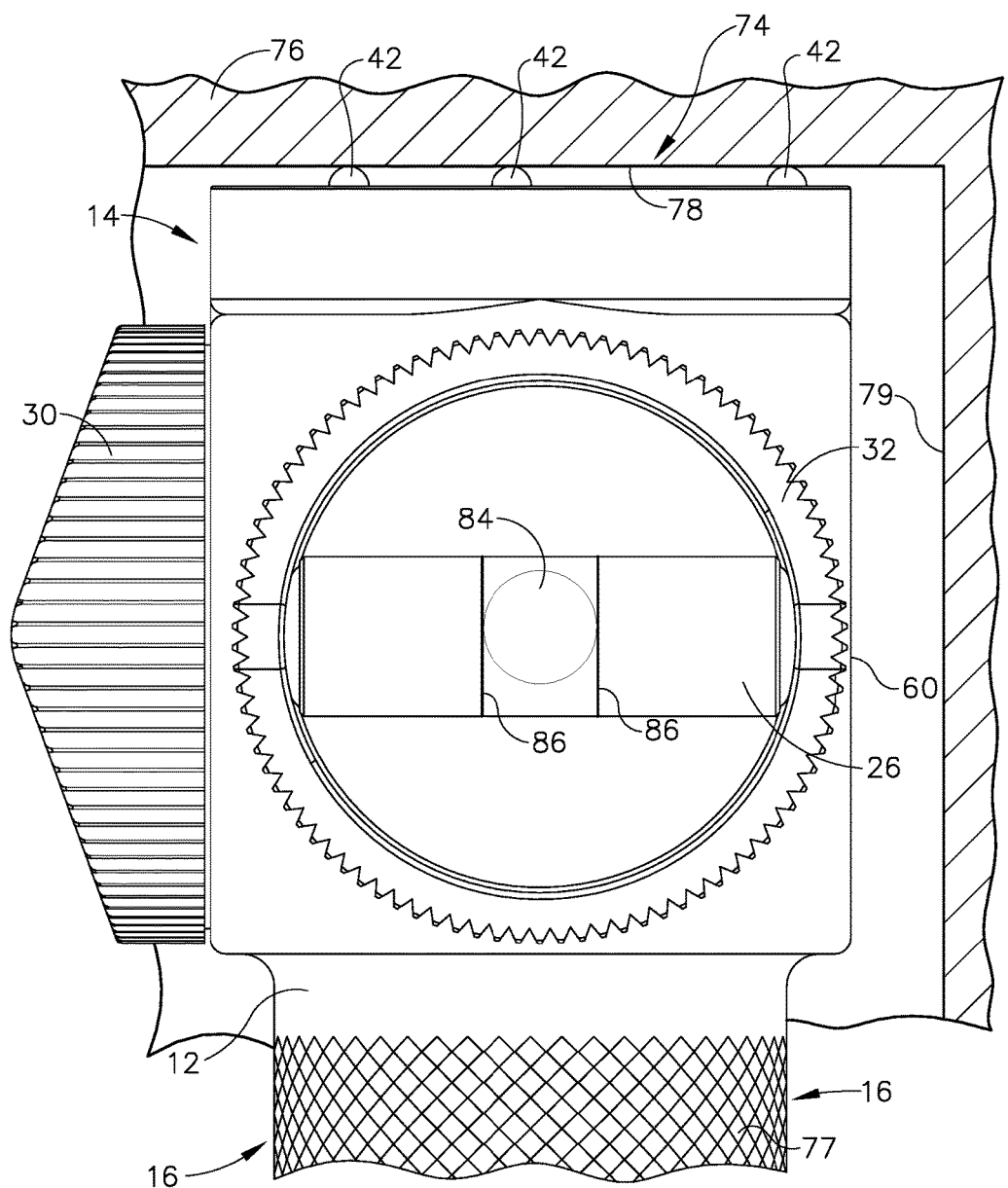
FIG. 5 is an enlarged partial view of the second embodiment of guide member of FIG. 3 with the guide member abutting a surface of a structural component in which a hole is intended to be drilled.

A second embodiment of first end portion 14 defines at least three projections 42 which extend in a direction away from guide member 12, as seen in FIG. 3. Each of at least three projections 42 defines a distal end surface 44 of guide member 12. In this example, distal end surface 44 is positioned at the end of each of the at least three projections 42. These at least three distal end surfaces 44 define an orientation of first plane 18' and distal end surfaces 44. These distal end surfaces 44 are placed in contact with surface 78, as seen in FIG. 5, in the process of identifying a reference plane to be discussed herein. First plane 18' as seen in FIG. 3, is similarly oriented in perpendicular relationship with respect to direction 21 of opening 20, as shown in FIG. 1 with respect to first plane 18. First plane 18', in this embodiment, is also perpendicular to length L of slot 40 which extends along guide member 12, as seen in FIG. 4. This perpendicular relationship permits a drill motor shaft 72 positioned within opening 20 to be positioned in a perpendicular orientation relative to first plane 18'.

At least three projections 42 are spaced apart from each other, as seen in FIG. 3, wherein distal end surface 44 of each of the three spaced apart projections 42 are needed as a minimum to determine a plane such as first plane 18'. In this example, the spacing between each successive projection of the at least three projections 42 are substantially the same distance providing a desirable symmetrical support arrangement with abutting the distal end surfaces 44 against surface 78, as seen in FIG. 5. The spacing of at least three projections 42, as mentioned above, assists in providing an orientation of first plane 18' relative to a surface to be drilled. Slot 40 is positioned substantially in perpendicular relationship with first plane 18' and this arrangement will, as will be discussed below, assist the user in accomplishing drilling a hole substantially perpendicular into surface 78. The method for using guide member 12 to drill a hole substantially perpendicular to surface 78 will be discussed in detail below.

Slot 40 of guide member 12, as seen in FIGS. 2 and 4, includes magnet 46 positioned within slot 40 which is used to assist in holding drill motor shaft 72, constructed of metal, within slot 40, as seen in FIG. 6. In this embodiment, second magnet 48 is also positioned within the slot 40 spaced apart from magnet 46 providing additional securement of drill motor shaft 72 within slot 40.

Additional assistance in securement of drill motor shaft 72 can be employed with including at least one spring plunger assembly 50, as seen in FIG. 4. Spring plunger assembly 50 is secured to guide member 12 such that plunger 52 extends in a direction toward opening 20. Plunger 52 travels toward opening 20 to abut drill motor shaft 72 which will be positioned in opening 20. Plunger 52 exerts greater force against drill motor shaft 72 as spring plunger assembly 50 is advanced toward opening 20 along threads 54 and spring 55 within assembly 50 is compressed. Spring plunger assembly 50 can be advanced in a direction away from opening 20 along threads 54 thereby removing securement force from being applied to drill motor shaft 72 and releasing drill motor shaft 72 from such securement within opening 20.

Surface 56 of guide member 12 defines opening 20 wherein a friction element 58 is associated with surface 56 such that friction element 58 has a surface with a higher static friction coefficient than surface 56. Friction element 58 can be employed to provide additional securement, if needed, of drill motor shaft 72 positioned within opening 20 with friction element 58 abutting a surface of drill motor shaft 72. Friction element 58 can resist longitudinal movement as well as rotational movement of drill motor shaft 72. Friction element 58 can be constructed from a wide selection of configurations. Friction element 58 can be constructed of a configuration from a wide variety selections. Friction element 58 can be constructed of a metallic knurled configuration forming surface 56 or may include an inlay of material such as constructed of rubber, silicone, etc. which will form surface 56 and provide a friction force when abutted against drill motor shaft 72.

Guide member 12 further defines, as seen in FIG. 2, a first wall member 60 which in turn defines flat surface 62 wherein first wall member 60 is attached to first end portion 14 of guide member 12. Flat surface 62 defines and extends in fourth plane 64. In this embodiment, second wall member 66 defines flat surface 68 which in turn defines and extends in fifth plane 70. Fourth plane 64 extends, in this embodiment, nonparallel relative to third plane 28 and first plane 18, as seen in FIG. 1. Fifth plane 70 extends, in this embodiment, nonparallel relative to second plane 24 and first plane 18. Fourth and fifth planes 64 and 70 are positioned in angular relationship to one another. Adjacent planes second, third, fourth and fifth planes 24, 28, 64 and 70 of this embodiment intersect in perpendicular relationship with one another and each of these planes are positioned perpendicular in this embodiment to first plane 18, 18'. This arrangement provides convenience in the operation of guide member 12.

The user of guide member 12 uses first wall member 60 and similarly second wall member 66 for purposes of establishing, in this example, a predetermined position or orientation of first wall member 60 has with wall surface 79, as seen in FIG. 5 with guide member 12 abutting wall 76 and replicating that predetermined position or orientation between first wall member 60 and wall surface 79 at the time of drilling as seen in FIG. 6.

The user with abutting guide member 12 to wall 76, in this embodiment, rotatably adjusts guide member 12 which carries first wall member 60 such that first wall member 60 faces wall surface 79. With guide member 12 abutting wall 76, the orientation of first wall member 60 with respect to wall surface 79 is at that time a predetermined position or orientation which has been established and observed. Later, at the time for drilling a hole into wall 76, as seen in FIG. 6, the user will replicate the predetermined position or orientation between first wall member 60 and wall surface 79 in the process of preparing to drill. With drill motor shaft 72 mounted to guide member 12 and drill bit 90 in abutting position to drill, the user rotatably adjusts guide member 12 carrying first wall member 60 such that first wall member 60 faces wall surface 79. At that point, user angularly positions drill and guide member 12 such that the observed predetermined position or orientation between first wall member 60 and wall surface 79 is replicated from the predetermined position or orientation that was originally established at the time of abutting guide member 12 to wall 76 as seen in FIG. 5. This process in conjunction with other steps to be discussed herein will facilitate orienting the position of the drill bit 90 to drill a hole substantially perpendicular to wall surface 78. This operation of use of first wall member 60 can similarly be employed to use second wall member 66 with respect to another wall being present in the drilling vicinity.

In referring to FIG. 5, device assembly 74 for forming a hole for accommodating a fastener in structural component 76 in fabricating an aircraft is shown. In this example, guide member 12 is positioned within a wing structure of an aircraft and is being used to form a hole that is substantially perpendicular to surface 78 of structural component 76. In this example, at least three projections 42 of first end portion 14 of guide member 12 are employed to abut surface 78.

Device assembly 74, in this embodiment, includes structural component 76 with surface 78 of an aircraft and guide member 12 which abuts against surface 78. Guide member 12 includes first end portion 14 and an opposing second end portion 16. First end portion 14 defines a first plane 18', as seen in FIG. 3, and first end portion 14 abuts against surface 78. When using the embodiment of flat surface 34 of guide member 12, as seen in FIGS. 1 and 2, flat surface 34 of first end portion 14 defines first plane 18 and is used to abut surface 78, as mentioned earlier.

Device assembly 74 further includes opening 20 defined by the guide member 12. Opening 20 extends in direction 21, as seen in FIG. 3, perpendicular to the first plane 18' defined by the first end portion 14. Also included are first bubble vial 22 attached to guide member 12 and which extends within second plane 24 and second bubble vial 26 which is also attached to guide member 12 wherein second bubble vial 26 extends within third plane 28. Second and third planes 24, 28 are positioned in angular relationship relative to one another and in this embodiment the angular relationship is perpendicular. Each of first and second bubble vial 22, 26 is rotationally adjustable relative to guide member 12.

An alternate embodiment to device assembly 74 which utilizes at least three projections to abut against surface 78 of structural component 76, as seen in FIG. 5, can include first end portion 14 defining flat surface 34, as seen in FIGS. 1 and 2. Flat surface 34 can alternatively be used in abutting guide member 12 against surface 78 of structural component 76. Flat surface 34 is positioned at distal end 36 of guide member 12. Flat surface 34 defines the orientation of first plane 18 as shown in FIG. 1 compared to similar first plane 18' defined by at least three projections 42 as seen in FIGS. 3 and 5. In both embodiments, first planes 18 and 18' are positioned in perpendicular relationship to direction 21 of opening 20. This relationship maintains drilling motor shaft 72, as seen in FIG. 6, which is positioned within opening 20, in perpendicular relationship to first planes 18 and 18'.

The at least three projections 42 as seen in FIG. 5 are spaced apart from one another and extend in a direction away from the guide member 12. Each of the at least three projections 42 defines a distal end surface 44 of guide member 12 and as described earlier, the distal end surface 44 of each of the at least three projections 42 define the orientation of the first plane 18', as seen in FIG. 3. Each of these at least three projections 42 will be the first parts of first portion 14 to contact surface 78 when abutting guide member 12 to structural component 76.

Opening 20 of guide member 12, as described earlier, is an elongated slot 40 which extends along guide member 12 and includes a length L, as seen in FIG. 4. Opening 20 extends in direction 21, as seen in FIG. 3, perpendicular to first plane 18' with use of at least three projections 42 or perpendicular to first plane 18 with use of embodiment utilizing flat surface 34, as seen in FIGS. 1 and 2.

In this embodiment device assembly 74 further includes first wall member 60, as seen in FIG. 2 as described above, attached to guide member 12 and positioned to extend in fourth plane 64 positioned, in this embodiment, perpendicular to third plane 28 and to first plane 18, 18'. Second wall member 66, as described earlier, is attached to guide member 12 positioned to extend in fifth plane 70 positioned, in this embodiment, perpendicular to second plane 24 and to first plane 18, 18'. First and second wall members 60 and 66 respectively, provide the user, as described above, to obtain a frame of reference in the process of drilling a substantially perpendicular hole with rotationally adjusting the guide member 12 carrying first wall member 60 to face, for example, wall surface 79, as seen in FIG. 5 and establish a predetermined position or orientation so as to replicate that predetermined position or orientation, as seen in FIG. 6, at the time for drilling structure component 76.

A method is described herein for forming a hole in structural component 76, as seen in FIG. 5. The method includes a step of abutting guide member 12 against surface 78 of the structural component 76 at a location on surface 78 at which the user intends to drill a hole into structural component 76. This hole is intended to be drilled substantially perpendicular to surface 78. The user can hand grip second end portion 16 which, in this embodiment, is configured with knurling 77 to assist user having a reliable grip of guide member 12, as seen in FIGS. 1 and 5.

Guide member 12, as earlier described, includes first end portion 14 and an opposing second end portion 16. First end portion 14 defines first plane 18' with use of one embodiment wherein the first end portion 14 defines at least three projections 42 as seen in FIG. 3. Alternatively, as described earlier, first end portion 14 defines first plane 18 with use of another embodiment of first end portion 14 which defines flat surface 34, as seen in FIGS. 1 and 2. With use of either of these embodiments, both first plane 18' and 18 are positioned perpendicular to direction 21 of opening 20 of guide member 12, as seen in FIGS. 1 and 3, as earlier discussed. Also both first plane 18 and 18' are positioned in substantially perpendicular relationship to a hole to be drilled when guide member 12 is in abutting relationship with surface 78. Thus, either embodiment of at least three projections 42 or flat surface 34 abutting against surface 78 can be employed in FIG. 5 for assisting to identify a reference plane which will be used to drill the hole substantially perpendicular to surface 78 of structural component 76.

In FIG. 5, the embodiment utilizing at least three projections 42 is shown. Opening 20 as shown in FIG. 4, defined by the guide member 12 extends a length L and in a direction 21, as seen in FIG. 3 perpendicular to first plane 18'. In use of the embodiment using flat surface 34 of FIGS. 1 and 2, flat surface 34 defines plane 18 which is also perpendicular to direction 21 to which opening 20 extends. In either case of using at least three projections 42 or flat surface 34 positioned abutting surface 78 first plane 18' or 18 respectively extend across a location of surface 78 in which the user intends to drill a hole substantially perpendicular to surface 78.

With guide member 12 abutting surface 78, as seen in FIG. 5, in a case where an adjacent wall surface 79 is present, the user can rotationally adjust guide member 12 which carries first wall member 60 such that first wall member 60 faces wall surface 79. With first wall member 60 facing wall surface 79, first wall member 60 is in a predetermined position or orientation with respect to wall surface 79. This predetermined position or orientation will be replicated at the time of drilling as shown in FIG. 6. Second wall member 66 (not shown) can be similarly used in a process to align guide member 12 properly if an adjacent wall is also present. The method further includes adjusting of first bubble vial 22 and second bubble vial 26 which are attached to guide member 12 as earlier discussed. First and second bubble vials 22 and 26, as seen in FIG. 1, will be used to identify a reference plane with guide member 12 in abutting relationship with surface 78 at a location in which a hole is intended to be drilled.

With guide member 12 placed in abutting position against surface 78, bubble 80, within first bubble vial 22, will attain a position within bubble vial 22. Unless vial 22 is now in a gravitational horizontal position, bubble 80 will be positioned out of alignment with respect to spaced apart marks 82.

As discussed above, vial 22 is attached to first dial member 30 which is rotationally adjustable relative to guide member 12. This arrangement permits vial 22 to be rotationally adjustable relative to guide member 12 by the user. In this embodiment, the two spaced apart marks 82 on vial 22 indicate a predetermined position of gravitational horizontal such that with bubble 80 positioned within two spaced apart marks 82, vial 22 will be positioned in a gravitational horizontal position. At this point with bubble 80 positioned outside of spaced apart marks 82, the user will turn first dial member 30 rotatably adjusting vial 22 until bubble 80 is positioned in a predetermined position of being within spaced apart marks 82. With guide member 12 in abutting relationship with surface 78 and bubble 80 so positioned between spaced apart marks 82, vial 22 now identifies a gravitational horizontal position within second plane 24.

It should be appreciated another reference orientation may be selected to be identified other than a gravitational horizontal position. This can be done with positioning the two spaced apart marks 82 in a different position along vial 22 such that adjusting first dial member 30 to position bubble 80 within those two spaced apart marks will provide a different predetermined position of vial 22 which will not be gravitational horizontal. It should be further appreciated the importance herein is not the absolute position of the predetermined position of vial 22 but it is to identify a predetermined position at the time of abutting guide member 12 against surface 78 and to replicate that position of vial 22 at a subsequent time with guide member 12 attached to drill motor shaft 72 prior to commencing the drilling of surface 78 of structural component 76, as will be described in further detail below.

With guide member 12 placed in abutting position against surface 78, bubble 84, within second bubble vial 26, will also attain a position within second bubble vial 26. Unless vial 26 is now in a gravitational horizontal position, bubble 84 will be positioned out of alignment with respect to spaced apart marks 86.

Vial 26 is attached to second dial member 32 which is rotationally adjustable relative to guide member 12. This arrangement permits vial 26 to be rotationally adjustable relative to guide member 12 by the user. In this embodiment, the two spaced apart marks 86 on vial 26 indicate a predetermined position of gravitational horizontal such that with bubble 84 positioned within two spaced apart marks 86, vial 26 will be positioned in a gravitational horizontal position. At this point, with bubble 80 positioned outside of spaced apart marks 86, the user turns second dial member 32 rotatably adjusting vial 26 until bubble 84 is positioned in another predetermined position of being within spaced apart marks 86. With guide member 12 in abutting relationship with surface 78 and bubble 84 so positioned between spaced apart marks 86, vial 26 now identifies a gravitational horizontal position within third plane 28.

It should be appreciated, as mentioned above with respect to first bubble vial 22, another reference orientation for second bubble vial 26 may be selected other than a gravitational horizontal position. This can be done with positioning the two spaced apart marks 86 in a different position along second bubble vial 26 such that adjusting second dial member 32 to position bubble 84 within those two spaced apart marks will provide a different predetermined position of vial 26 which will not be gravitational horizontal. It should be further appreciated the importance herein is not the absolute position of the predetermined position of vial 26 but it is to identify a predetermined position at the time of abutting guide member 12 against surface 78 and to replicate that position of vial 26 at a subsequent time with guide member 12 attached to drill motor shaft 72 prior to commencing the drilling of surface 78 of structural component 76.

With bubbles 80 and 84 properly positioned in the above described respective predetermined positions, in this embodiment, a gravitational horizontal reference plane has been identified with guide member 12 in abutting contact with surface 78. First bubble vial 22 and second bubble plane 26 are respectively positioned within second plane 24 and third plane 28 which are, in turn, positioned in angular relationship to one another which orientation assists in providing identifying a reference plane. In the present embodiment, second plane 24 and third plane 28 are positioned perpendicular to one another which also provides assistance in identifying a plane.

With the predetermined position or orientation of first wall member 60 established and observed with respect to wall surface 79, and with vials 22 and 26 having been rotationally adjusted relative to guide member 12 to establish, in this embodiment, the identification of a gravitational horizontal reference plane, the method further includes the step of removing first end portion 14 of guide member 12 from abutting relationship with surface 78.

The method further includes positioning drill motor shaft 72, as seen in FIG. 6, into opening 20 of guide member 12 such that drill motor shaft 72 extends in a direction away from guide member 12 and beyond first end portion 14 of guide member 12. Drill motor shaft 72 extends in direction 21 being perpendicular to either first plane 18' with using the embodiment which utilizes at least three projections 42, as seen in FIG. 6, or first plane 18 with utilizing the embodiment which uses flat surface 34 of first end portion 14 as seen in FIGS. 1 and 2.

Drill motor shaft 72 is secured into opening 20 of guide member 12 with use of magnets 46, 48 and/or spring plunger assembly 50 and other securement assistance as is needed and as described earlier. Drill motor shaft 72 is non-rotational and is held in a fixed position within opening 20. Drill motor shaft 72 at one end is positioned and secured to drill motor 88, as seen in FIG. 6. At an opposing end of drill motor shaft 72 a drill bit 90 is positioned.

Drill bit 90 is connected to drill motor 88 through linkage positioned within drill motor shaft 72 such that drill motor 88 can impart rotational movement to drill bit 90. In the embodiment shown in FIG. 6, drill bit 90 is positioned in alignment with drill motor shaft 72. Other configurations of connecting and positioning drill bit 90 can be employed such as connecting drill bit 90 in an offset position (not shown) from alignment with respect to drill motor shaft 72. A horizontal set of drive gears (not shown) can be employed extending in a direction laterally from drill motor shaft 72 to rotationally connect to and laterally position drill bit 90 from drill motor shaft 72. In turn, the horizontal set of gears are also coupled or linked to drill motor 88 through linkage positioned within drill motor shaft 72. This configuration can provide drill bit 90 access to more remote and difficult to access positions on surface 78.

Once drill motor shaft 72 is secured within opening 20 of guide member 12, the method further includes a step of positioning drill bit 90, associated with drill motor shaft 72 as described above, in abutting relationship with the surface 78, as seen in FIG. 6. Drill bit 90 is positioned within an area on surface 78 in which first end portion 14 was initially positioned in overlying relationship with surface 78, as seen in FIG. 5, when first end portion 14 was placed in abutting relationship to surface 78.

With drill bit 90 positioned on surface 78, the method further includes rotationally adjusting guide member 12 such that the first wall member 60 attains the predetermined position or orientation, which had been previously observed in FIG. 5, with respect to wall surface 79. The method further includes adjusting the angular position of the drill motor shaft 72 and guide member 12 relative to surface 78 of the structural component 76 to position bubble 80 of first bubble vial 22 to become located at the predetermined position within bubble vial 22 as previously discussed. This is also done to position bubble 84 of the second bubble vial 26 to become located at the other predetermined position within second bubble vial 26, as also previously discussed.

With bubbles 80 and 84 in this embodiment positioned in their predetermined positions, the gravitational horizontal plane has been referenced. With these adjustments made, drill bit 90 will attain a substantially perpendicular position with respect to surface 78. Once this position is established, the user activates drill motor 88 drilling a hole into the structural member of wall 76.

While various embodiments have been described above, this disclosure is not intended to be limited thereto. Variations can be made to the disclosed embodiments that are still within the scope of the appended claims.

What is claimed:

1. A device, comprising:
    a guide member comprising a first end portion and an opposing second end portion, wherein:
        the first end portion defines a first plane; and
        an opening defined by the guide member, wherein the opening extends along the guide member in a direction perpendicular to the first plane; and
    a first bubble vial attached to the guide member wherein the first bubble vial extends within a second plane and is rotationally adjustable relative to the guide member within the second plane for identifying a predetermined position within the second plane with the first end portion positioned abutting a surface; and
    a second bubble vial attached to the guide member, wherein:
        the second bubble vial extends within a third plane and is rotationally adjustable relative to the guide member within the third plane independently of the first bubble vial for identifying a predetermined position within the third plane with the first end portion positioned abutting the surface;
        the second and third planes are in angular relationship relative to one another; and
        at least one of a first wall member defined by the guide member wherein the first wall member is positioned to extend in a fourth plane positioned nonparallel to the second plane and the first plane, or a second wall member defined by the guide member wherein second wall member is positioned to extend in a fifth plane positioned nonparallel to the third plane and the first plane; wherein the fourth and fifth planes are positioned in angular relationship to one another.

2. The device of claim 1, wherein the first end portion comprises a flat surface positioned at a distal end of the guide member which defines the orientation of the first plane.

3. The device of claim 2, wherein the flat surface is configured to define a recess in which the recess is in communication with the opening defined by the guide member.

4. The device of claim 1, wherein the first end portion comprises at least three projections which extend in a direction away from the guide member, wherein:
    each of the at least three projections defines a distal end surface of the guide member; and
    the distal end surface of each of the at least three projections define the orientation of the first plane.

5. The device of claim 4, wherein the at least three projections are spaced apart from each other.

6. A device, comprising:
    a guide member comprising a first end portion and an opposing second end portion, wherein:
        the first end portion defines a first plane;
        an opening defined by the guide member, wherein the opening extends along the guide member in a direction perpendicular to the first plane;
        the opening comprises an elongated slot which extends along the guide member and has a length which extends in the direction perpendicular to the first plane; and
        a magnet is positioned within the slot; and
    a first bubble vial attached to the guide member wherein the first bubble vial extends within a second plane and is rotationally adjustable relative to the guide member within the second plane for identifying a predetermined position within the second plane with the first end portion positioned abutting a surface;
    a second bubble vial attached to the guide member, wherein:
        the second bubble vial extends within a third plane and is rotationally adjustable relative to the guide member within the third plane independently of the first bubble vial for identifying a predetermined position within the third plane with the first end portion positioned abutting the surface; and
        the second and third planes are in angular relationship relative to one another.

7. The device of claim 6, further includes a second magnet positioned within the slot spaced apart from the magnet.

8. The device of claim 1 further includes at least one spring plunger assembly secured to the guide member such that the plunger extends in a direction toward the opening.

9. The device of claim 1, wherein the guide member comprises a surface which defines the opening, wherein a friction element is associated with the surface such that the friction element comprises a surface comprising a higher static friction coefficient than the surface which defines the opening of the guide member.

10. A device assembly for forming a hole for accommodating a fastener in fabricating an aircraft, comprising:
    a structural component of an aircraft comprising a surface;
    a guide member which abuts against the surface, wherein the guide member comprises:
        a first end portion and an opposing second end portion, wherein the first end portion defines a first plane and the first end portion abuts against the surface; and
        an opening defined by the guide member, wherein the opening extends in a direction perpendicular to the first plane defined by the first end portion; and
    a first bubble vial attached to the guide member wherein the first bubble vial extends within a second plane and is rotationally adjustable relative to the guide member within the second plane for identifying a predetermined position within the second plane with the first end portion positioned abutting a surface; and
    a second bubble vial attached to the guide member wherein:
        the second bubble vial extends within a third plane and is rotationally adjustable, independently with respect to the first bubble vial, relative to the guide member within the third plane for identifying a predetermined position within the third plane with the first end portion positioned abutting the surface;
        the second and third planes are positioned in angular relationship relative to one another; and includes at least one of a first wall member defined by the guide member that is positioned to extend in a fourth plane positioned nonparallel to the second plane and the first plane, and a second wall member defined by the guide member is positioned to extend in a fifth plane positioned nonparallel to the third plane and to the first plane.

11. The device of claim 10, wherein the first end portion comprises a flat surface positioned at a distal end of the guide member which defines the orientation of the first plane.

12. The device of claim 10, wherein the first end portion comprises at least three projections spaced apart from one another and which extend in a direction away from the guide member, wherein:

each of the at least three projections defines a distal end surface of the guide member; and the distal end surface of each of the at least three projections define the orientation of the first plane.

13. The device of claim 10, wherein the opening comprises an elongated slot which extends along the guide member and includes a length which extends in the direction perpendicular to the first plane.

14. A method for forming a hole in a structural component, comprising the steps of:

abutting a guide member against a surface of the structural component, wherein the guide member, comprises:

a first end portion and an opposing second end portion, wherein the first end portion defines a first plane and the first end portion abuts against the surface at a location for positioning a hole to be drilled into the structural component; and an opening defined by the guide member, wherein the opening extends in a direction perpendicular to the first plane; and rotationally adjusting the guide member such that a first wall member defined by the guide member reaches a predetermined position wherein the first wall member extends in a nonparallel direction relative to the first plane; and rotationally adjusting a first bubble vial rotationally attached to the guide member such that a bubble within the first bubble vial is positioned into a predetermined position within the first bubble vial and rotationally adjusting a second bubble vial rotationally attached to the guide member, independently with respect to the first bubble vial, such that a bubble within the second bubble vial is positioned into another predetermined position within the second bubble vial, wherein:

the first bubble vial extends within a second plane; and the second bubble vial extends within a third plane, wherein the second and third planes are positioned in angular relationship relative to one another.

15. The method of claim 14 further includes steps of:

removing the first end portion of the guide member from abutting relationship with the surface; and positioning a drill motor shaft into the opening of the guide member such that the drill motor shaft extends in a direction away from the guide member and beyond the first end portion of the guide member.

16. The method of claim 15 further includes a step of positioning a drill bit associated with the drill motor shaft in an abutting relationship with the surface within an area on the surface in which the first end portion in overlying relationship with the surface when the first end portion is in abutting relationship to the surface.

17. The method of claim 16 further includes steps of:

rotationally adjusting the guide member such that the first wall member attains the predetermined position;

adjusting the angular position of the drill motor shaft and the guide member relative to the surface of the structural component such that the bubble of the first bubble vial becomes located at the predetermined position within the first bubble vial and the bubble of the second bubble vial becomes located at the other predetermined position within the second bubble vial; and drilling a hole into the structural component.

* * * * *